Sept. 25, 1956  E. P. ROTHENBERGER  2,763,992
IRRIGATION WEIR
Filed Sept. 16, 1952  2 Sheets-Sheet 2
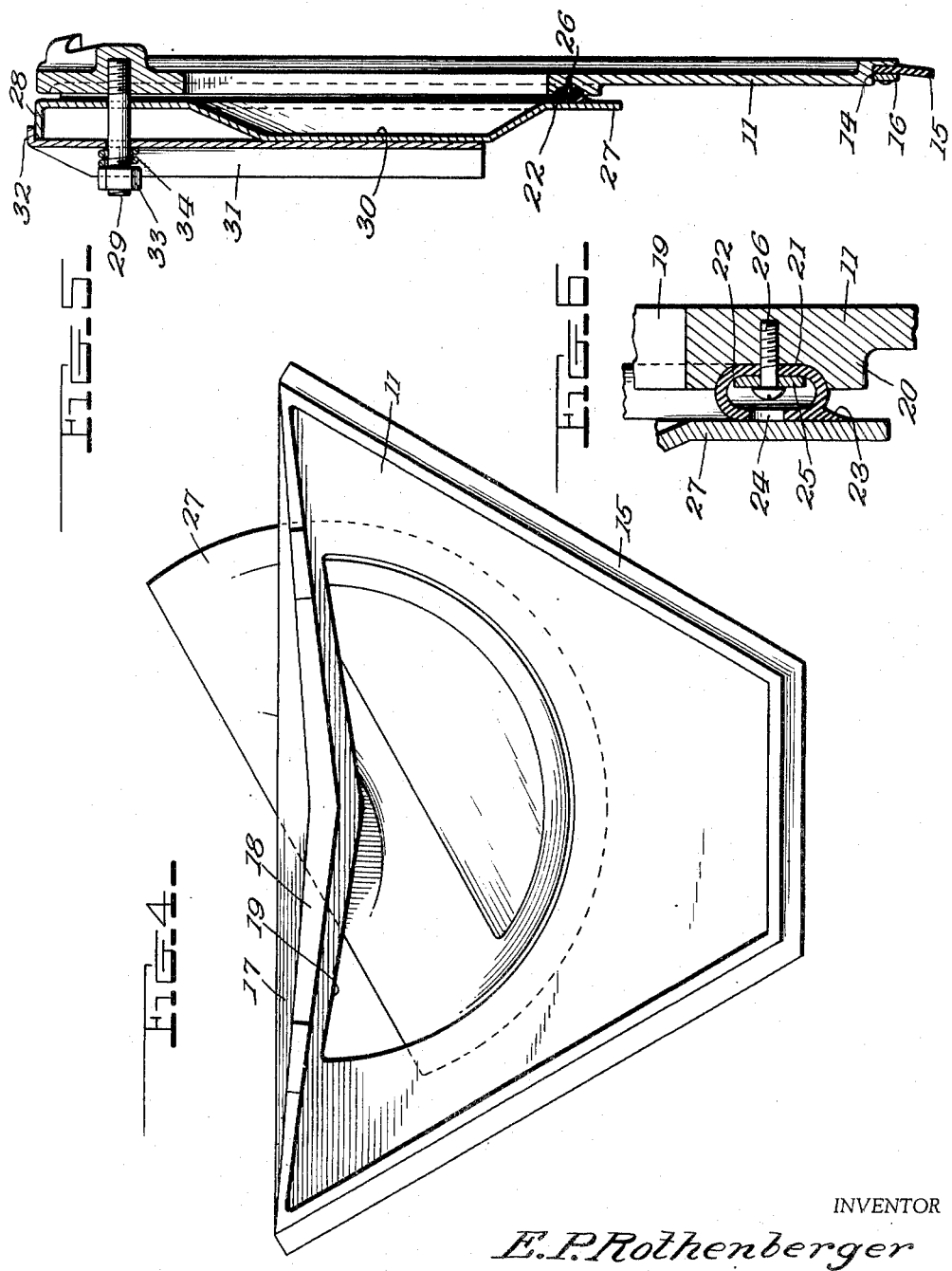
INVENTOR
E. P. Rothenberger
BY Mason, Porter, Diller & Stewart
ATTORNEYS

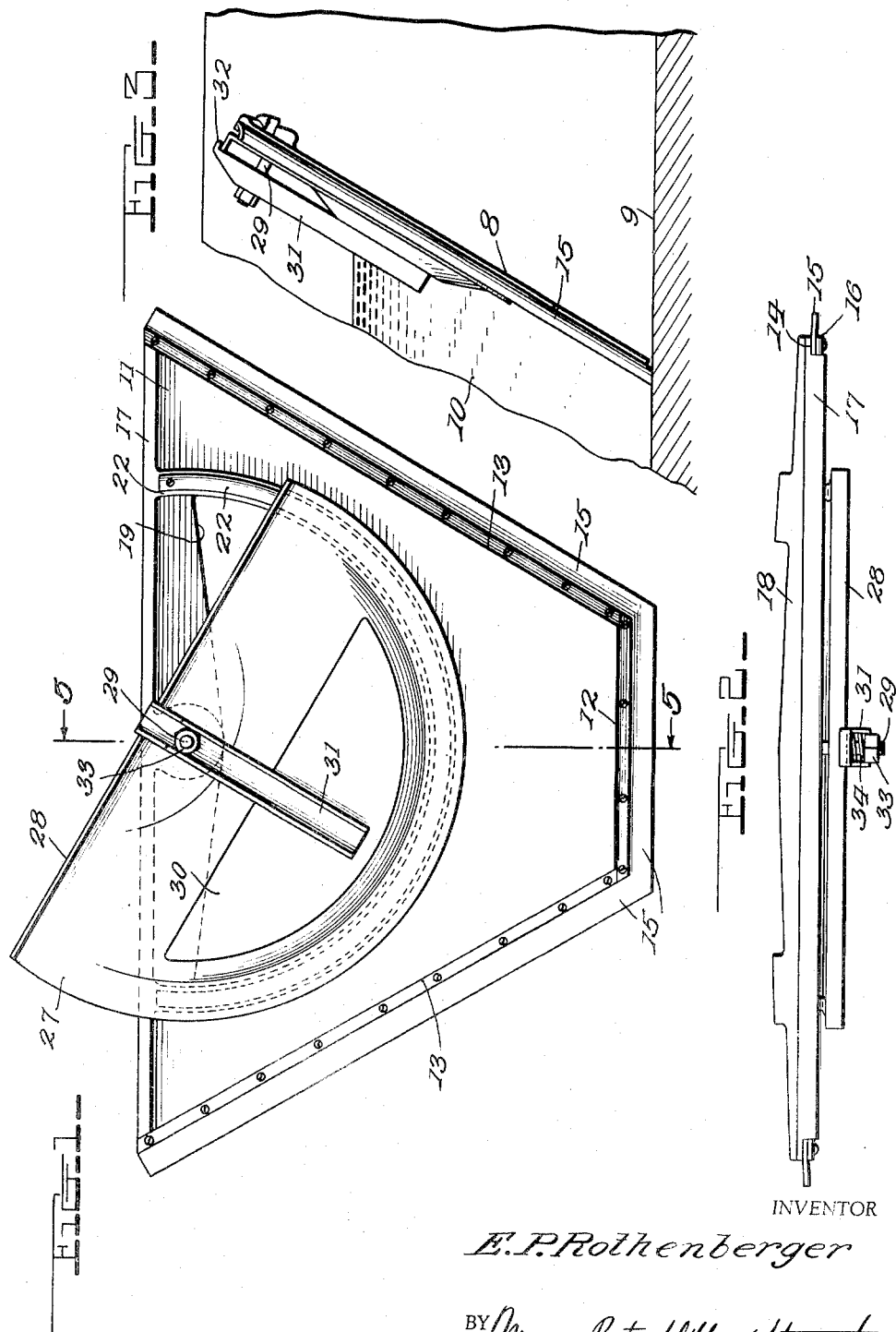

2,763,992
IRRIGATION WEIR

Eldon P. Rothenberger, Casa Grande, Ariz.

Application September 16, 1952, Serial No. 309,871

7 Claims. (Cl. 61—29)

The invention of which the following is a detailed specification, relates to novel improvements in weirs for irrigation ditches. In many localities, crops are grown dependent upon water from irrigation ditches. The flow to the fields is controlled by temporary weirs by which the water from the main irrigation ditch is diverted to the fields as needed.

There is a definite problem in providing for weirs which can be readily transported and installed at any desired point. Such weirs must be capable of effectively sealing the discharge through the irrigation ditch until the level of water has been raised to the point where some may be diverted into the ditches leading to the fields being watered.

It is the purpose of my invention to provide a simple weir which may be readily transported and installed to seal the flow out of the main ditch.

It is a further object of my invention to provide for this sealing to be accomplished by the pressure of the water as built up against the weir.

A still further object of my invention is to provide an adjustable gate or shutter giving a maximum opening for the travel of excess water through the weir. Such a gate will be easily adjusted manually.

Among the objects of my invention is to provide a shutter which is resiliently held against the gasket or sealing tube around the discharge opening.

By reason of the particular mode of construction, the weir and its parts can be constructed economically, of minimum weight and extremely durable.

As illustrating the preferred form of my invention, I have shown the improved weir in the accompanying drawings in which Fig. 1 is a front elevation of the improved weir;
Fig. 2 is a top plan view;
Fig. 3 is a side elevation of the weir as installed in an irrigation ditch;
Fig. 4 is a rear elevation of the weir;
Fig. 5 is a vertical cross-section on the line 5—5 of Fig. 1 and
Fig. 6 is an enlarged cross-sectional detail of the supporting rib for the movable shutter.

By the construction of the weir as described below, I have provided a light but extremely durable device which may be readily transported and installed at any desired point in the main irrigation ditch. The gate or shutter is of a type which will be held tight by hydrostatic pressure. At the same time, it may be readily shifted manually to give any desired escape of the excess water. This may be a maximum which will discharge substantially all of the water normally flowing in the main ditch. In adjusting the opening of the gate, the discharge commences from the top or at the water level, and the flow is increased as the discharge edge of the gate is lowered.

In the drawings, Fig. 3 illustrates the side elevation of the improved weir 8 as installed in closed position in an irrigation ditch 9. The ditch 9 is of the usual form, having a flat bottom and upwardly diverting sides. The impounded water 10 serves to hold the weir 8 against both the bottom and sides of the ditch, thus sealing against the loss of any substantial quantity of water.

The weir includes a plate 11 of cast metal alloy. Alloys now available on the market are suitable for the construction of the plate and at the same time reduce the weight to a minimum, so that the weir may be handled by one man.

The plate 11 has a horizontal bottom 12 and upwardly flaring edges 13, 13. These are angularly disposed so that the weir will rest against the side walls of the ditch in the inclined position indicated in Fig 3.

The side and bottom edges of the plate are rabbeted to form a groove 14. This groove has removable resilient fins 15, extending beyond the edges of the plate. The fins 15 are held in place by means of bolted strips 16. The fins 15 thus conform to the surfaces of the bottom and sides of the ditch, and water pressure will hold the fins substantially in sealing position.

The top 17 of the plate is horizontal and in the form of a thickened truss or cross-bar as shown at 18 in Fig. 4. At its center the cross-bar 18 forms an enlargement to receive a pivot bolt 29.

The plate 11 beneath the cross-bar 18 is cut away to form a substantially semicircular gateway 19 centered on the pivot bolt 29.

On the up-stream side of the weir, the gateway 19 is surrounded by a semicircular rib 20. This rib has a semicircular channel 21. The channel 21 forms the seat for a sealing cushion 22 in the form of a tube of rubber or similar resilient material. The cushion 22 has a lateral flange 23 which assists in sealing off the opening.

The cushion 22 has spaced openings 24. A semicircular bar 25 is held within the tubular cushion 22. The bar is apertured in line with the spaced openings 24. This permits bolts 26 to be inserted through the openings of the rib, the bar 25 and anchored into the plate as shown in Fig. 6.

The gate or shutter 27 is also semicircular in form and overlaps the edge of the gateway as shown in Fig. 1.

The shutter is made of sheet metal which can be stamped into the desired form. Along the straight edge forming a chord, the shutter has a flange 28. The shutter has a pivot bolt 29 passing through an axial hole at its geometrical center and anchored in the truss 18 (see Fig. 5).

Reference to "center" and "semicircular" is used in the strict geometrical sense as defined in the dictionary.

The shutter has a raised land 30 which forms a reinforcement and holds the semicircular rim of the shutter in a plane. This land also serves as a point of leverage for the bar which holds the shutter in place.

A channel bar 31 is provided of generally U-shaped cross-section. At one end it has a tongue 32 which is intended to lock over the flange 28 of the shutter. The channel bar is loosely journalled on the shank of the pivot bolt 29. The bolt 29 is screw-threaded at its free end to receive a hexagonal nut 33. This nut is so proportioned that it can be held with its opposite sides closely fitting within the sides of the channel bar and thus cannot be loosened inadvertently. A spring 34 between the channel bar and the nut holds the former down against the flange 28 and the land 30.

In assembling the bar on the shutter, the bar is held in the space above and parallel to the land until the nut is drawn up. After this, the bar may be rotated and the spring compressed so that the tongue 32 will fit over the flange 28 into the position shown in Fig. 5.

The bar 31 applies pressure against the shutter holding it against the face of the cushion 22 and the flange 23. The operator may give partial rotation by pulling on the flange 28, thus closing the gateway or opening it to the desired extent. In opening, the aperture starts at the top and drops lower to increase the amount of discharge. In any position, the gate or shutter is sealed against the cushion and water pressure aids in keeping them in sealed relation.

The weir constructed as above described has proved to be easy to handle and install, as well as easy to manipulate for adjustable discharge. The gate prevents escape of any material amount of impounded water by reason of the fins on the edges on the cushion surrounding the circular edge of the gateway. The gate or shutter is resiliently held in position by reason of the particular construction of the parts.

While the preferred form of the invention has been illustrated and described, it is to be understood that numerous changes in minor detail such as material and proportions may be carried out without departing from the scope of the following claims.

What I claim is:

1. An irrigation weir comprising a plate, sealing means along the bottom and side edges of the plate, said plate having a horizontal cross-bar and an opening below the cross-bar with a semicircular lower edge with its geometrical center within said cross-bar, a generally semicircular gate pivoted at its geometrical center on the up-stream side of the cross-bar at the said geometrical center of the opening and resilient means for holding the gate against the plate over the opening.

2. An irrigation weir comprising a plate, sealing means along the bottom and side edges of the plate, a horizontal cross-bar forming the top of the plate, the plate having a semicircular opening below the cross-bar, a pivot pin extending laterally from the side of the cross-bar centrally of the opening, a generally semicircular gate with its geometrical center loosely journalled on the pin and extending over the up-stream side of the opening, a bar mounted on the pin for engagement on the side of the gate and resilient means on the pin for pressing the bar against the gate.

3. An irrigation weir comprising a plate, sealing means along the bottom and side edges of the plate, a horizontal cross-bar forming the top of the plate, the plate having a semi-circular opening below the cross-bar, a pivot pin extending laterally from the side of the cross-bar centrally of the opening, a generally semicircular gate with its geometrical center loosely journalled on the pin and extending over the up-stream side of the opening, a channel bar mounted on the pin for engagement on the side of the gate, a coil spring on the pin in the channel bar and a nut threaded on the end of the pin and held against rotation by the sides of the channel bar.

4. An irrigation weir comprising a plate, sealing means along the bottom and side edges of the plate, a horizontal cross-bar forming the top of the plate, the plate having a semicircular opening below the cross-bar, a pivot pin extending laterally from the side of the cross-bar centrally of the opening, a generally semicircular gate with its geometrical center loosely journalled on the pin, and extending over the up-stream side of the opening, said gate having a flange on one straight side and a raised land inside the opposite curved edge, a channel bar mounted on the pin and engageable with the said land and flange of the gate, a coil spring on the pin in the channel bar and a nut threaded on the end of the pin.

5. An irrigation weir comprising a plate, sealing means along the bottom and side edges of the plate, a horizontal cross-bar forming the top of the plate, the plate having a semicircular opening below the cross-bar, a pivot pin extending laterally from the side of the cross-bar centrally of the opening, a generally semicircular gate with its geometrical center loosely journalled on the pin and extending over the up-stream side of the opening and a cushioning member attached to the plate around the opening therein.

6. An irrigation weir comprising a plate, sealing means along the bottom and side edges of the plate, a horizontal cross-bar forming the top of the plate, the plate having a semicircular opening below the cross-bar, a pivot pin extending laterally from the side of the cross-bar centrally of the opening, a generally semicircular gate with its geometrical center loosely journalled on the pin and extending over the up-stream side of the opening, a groove in the plate around the curved edge of the opening, a tubular cushion in the groove and holding means in the cushion.

7. An irrigation weir comprising a plate, sealing means along the bottom and side edges of the plate, a horizontal cross-bar forming the top of the plate, the plate having a semicircular opening below the cross-bar, a pivot pin extending laterally from the side of the cross-bar centrally of the opening, a generally semicircular gate with its geometrical center loosely journalled on the pin and extending over the opening, a tubular cushion around the curved edge of the opening, holding means for the cushion and an outwardly projecting flange on the cushion.

References Cited in the file of this patent

UNITED STATES PATENTS

| | | |
|---|---|---|
| 432,474 | Brinkop | July 15, 1890 |
| 1,404,325 | Schaefer | Jan. 24, 1922 |
| 1,564,927 | Ballard | Dec. 8, 1925 |
| 1,968,743 | Christoffersen | July 31, 1934 |
| 1,970,451 | Gottlieb | Aug. 14, 1934 |
| 2,345,650 | Attwood | Apr. 4, 1944 |
| 2,411,727 | Homan | Nov. 26, 1946 |
| 2,619,253 | Fuchs | Nov. 25, 1952 |